ULTRA-PURE, ULTRA-THIN FILMS OF NIOBIUM OXIDE

Filed May 2, 1960

INVENTOR,
LYDIA A. SUCHOFF
BY Jack H. Lunacott
ATTORNEY.

United States Patent Office
3,047,424
Patented July 31, 1962

3,047,424

ULTRA-PURE, ULTRA-THIN FILMS OF NIOBIUM OXIDE

Lydia A. Suchoff, Shrewsbury, N.J., assignor to the United States of America as represented by the Secretary of the Army Filed May 2, 1960, Ser. No. 26,383
1 Claim. (Cl. 117—119.6)
(Granted under Title 35, U.S. Code (1952), sec. 266)

Figure 1:
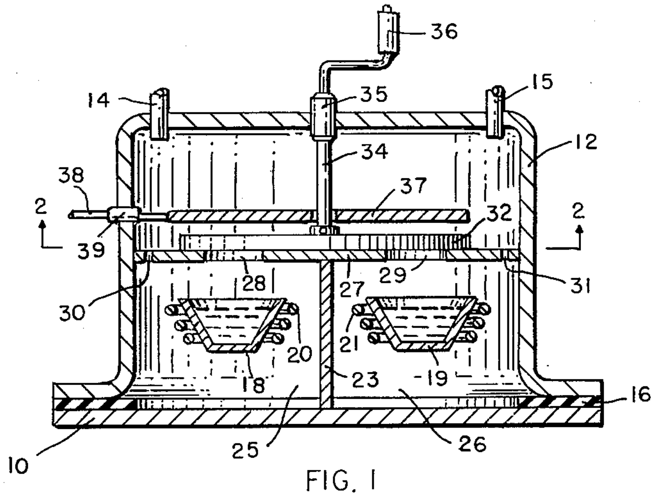

The invention described herein may be manufactured and used by or for the Government for governmental purposes without the payment of any royalty thereon.

This invention relates to a method of making ultra-pure, ultra-thin films of niobium oxide ($Nb_2O_5$) having an extremely high dielectric constant.

Present methods of making extremely thin films of niobium oxide consist in anodizing a niobium metal sheet in the same way as aluminum oxide is formed by anodization of aluminum sheet. These methods have several grave disadvantages. Niobium metal is very expensive primarily because it has to be ultra pure in order that the anodized film be continuous. The smallest traces of impurities will produce holes in the anodized film. Besides, anodized niobium oxide films are "polar" and therefore one practice is to coat them with manganese dioxide ($MnO_2$) prior to attaching the second electrode. Manganese dioxide is usually applied as an alcoholic solution of manganese nitrate. This solution is sprayed on to the niobium slug while the latter is heated to the decomposition temperature of manganese nitrate. The slug also may be immersed in the manganese nitrate solution and then heated at higher temperature. In either case the heating of the niobium slug to higher temperature results in thermal shock which will often rupture the anodized niobium oxide film thus causing shorts. In spite of the fact that the dielectric constant of niobium oxide is about five times greater than that of aluminum oxide the above-described disadvantages have thus far prevented a more extensive application of niobium oxide as dielectric film.

I now have found that all these disadvantages may be overcome and an ultra-thin, ultra-pure, and non-polar film of niobium oxide may be obtained if the substrate is coated with a film consisting of a solution of niobium alcoholate in an organic solvent whereupon the organic solvent is allowed to evaporate and the dried film heated to obtain the ultra pure niobium oxide film.

The invention will become more apparent from the following detailed description of specific embodiments of the general inventive idea.

*Example 1*

Niobium isopropylate is diluted with methyl alcohol to obtain a solution containing 1 to 3% of niobium as metal. The substrate that has to be coated is dipped into this solution and pulled out at a uniform rate so that a thin film of the solution will remain on the surface. On drying, this niobium isopropylate film will decompose to form niobium oxide ($Nb_2O_5$). The coated plate is then heated to between 200 and 300° C. for about 15 minutes to volatilize any excess alcohol or other volatile matter and moisture. This procedure of dipping, drying and heating is repeated until the desired film thickness of niobium oxide is obtained whereupon the second electrode is deposited on the niobium oxide film in known manner.

Preferably, the plate or substrate carrying the niobium oxide film is heated prior to the deposition of the second electrode.

*Example 2*

Figure 2:
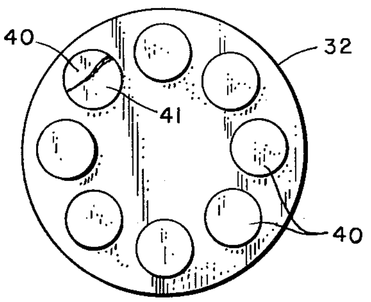

The niobium oxide film may also be deposited on the plate or substrate by vacuum evaporation using a well-known apparatus as shown in the accompanying drawing in which FIG. 1 is a diagrammatic view partly in vertical section of an apparatus for carrying out the vacuum deposition and FIG. 2 is a sectional view taken on the line 2—2 of FIG. 1 showing a plate for depositing niobium oxide films of predetermined circular dimensions.

Referring to FIGS. 1 and 2 the apparatus shown in the drawing comprises a vacuum chamber formed by a base member 10 having a removable shell 12 which is maintained under vacuum by means of conduits 14 and 15 connected to a suitable vacuum pump not shown in the drawing. Between the lip of the lower edge of the shell 12 and the base 10 is a sealing strip 16. Within the vacuum chamber are two crucibles 18 and 19 the supports of which are not shown in the drawing. These crucibles 18 and 19 are heated by any suitable means such as high frequency induction coils 20 and 21 respectively. The wall 23 divides the circular area into two compartments 25 and 26 allowing different compounds to evaporate in each compartment.

Fixed to the top portion of the wall 23 is a cover 27 having apertures 28 and 29 over the respective crucibles 18 and 19 and also apertures 30 and 31 to allow evacuation of the separate compartments 25 and 26. The plate or substrate 32 is supported by the plate 27 and can be rotated by means of a vertical shaft 34 provided with a vacuum seal 35 in the top of the shell 12 and made to be rotated by a hand crank 36. A heating plate 37 is arranged over the plate 32 which heating plate is carried by a shaft 38 provided with a vacuum seal 39.

The operation of the device above-described is substantially as follows:

The crucible 18 is filled with pure liquid niobium isopropylate. The crucible 19 is filled with metallic gold. The apparatus is evacuated and the crucible 18 containing the niobium isopropylate is heated by means of the high frequency coil 20 until the niobium isopropylate starts to evaporate.

The boiling point of the pure niobium isopropylate will, of course, depend on the vacuum in the system. For instance, at 2.5 mm. pressure the boiling point of the niobium isopropylate lies between 202 to 206° C. The niobium isopropylate vapors will go thru the hole 28 and will condense in the form of a circular film 40 (FIG. 2) on the substrate 32 since the temperature of this substrate is below the boiling point of the niobium isopropylate at that pressure. When the desired film thickness is achieved the plate 32 is turned to allow the next film 40 to form and after the plate 32 is covered with all the circular films 40 it can take, the induction coil 20 is turned off and moist air is allowed to enter into the system. The heater 37 is now brought into action and the plate 32 carrying the niobium isopropylate film is thus heated to cause the niobium isopropylate to decompose to niobium oxide. The plate 32 is then further heated at atmospheric pressure to insure that all volatile materials are removed. To further purify the niobium oxide the system is again evacuated and the plate 32 is heated to 200° C. under vacuum for a short time. This procedure of condensing the niobium alcoholate vapors on plate 32 and the drying and heating of the deposited films may be repeated until the desired film thickness of niobium oxide is obtained whereupon the second electrode is deposited on the niobium oxide film by the well-known vacuum deposition of gold (or other metals) from the crucible 19. Going thru the hole 29 the gold particles deposit on to the successive circular films of niobium oxide thus constituting the second electrode 41 (FIG. 2).

*Example 3*

Niobium isopropylate and potassium methylate is dissolved in stoichiometric proportions in methyl alcohol to obtain a solution containing about 2% of solids. The plate or substrate that is to be coated is now dipped into this solution and pulled out at a uniform rate so that a thin film will remain on the surface. On drying a thin film of potassium niobate ($K_2Nb_2O_7$) is obtained and the coated plate is then heated to about 300° C. for about 15 to 20 minutes to volatilize any excess alcohol or other volatile matter and moisture. This procedure of dipping, drying and heating is repeated until the desired film thickness of potassium niobate is obtained whereupon the second electrode is deposited on the potassium niobate film in known manner.

For the purpose of obtaining certain physical or electrical characteristics the above described niobate films may be modified by the incorporation of certain other oxides which will either combine with Nb oxide to form multi-component oxide systems where Nb oxide is one of the constituent oxides or the main constituent or where certain other oxides will impart certain properties to the film. These oxides may be incorporated by adding their metal alcoholates in stoichiometric proportions to the niobium alcoholate solutions. A solution of such combined alcoholates will deposit films of the oxides in homogeneous and equal distribution. The films made according to this invention can be formed on any substrate in any desired thickness. The new films are "non-polar," that is, nonconductive and may be obtained in thicknesses of the order of Angstrom units thus realizing more capacitance per unit volume if used as dielectrics in capacitors.

The films according to the invention may be used to great advantage to form rolled capacitors by coating metallized tape and rolling to form a capacitor.

It will be obvious to those skilled in the art that the above-described examples constitute only illustrative embodiments of the broad inventive idea. Instead of niobium isopropylate other niobium alcoholates may be used such as the ethylate, propylate or butylate. The potassium methylate in Example 3 may be replaced by other potassium alcoholates as for instance the ethylate, propylate, butylate, etc., or by other alcoholates such as those of barium, strontium, silicon, titanium or the like. Other modifications and combinations may of course also be used without departing from the spirit of the invention as defined in the following claim.

What is claimed is:

A process for producing ultra-thin, ultra-pure and uniformly homogeneous niobium oxide films comprising preparing a 1 to 3% solution of a member of the group consisting of niobium ethylate and niobium isopropylate in an organic solvent selected from the group consisting of methyl alcohol, ethyl alcohol and isopropyl alcohol, coating the surface of a substrate with a thin film of said solution at room temperature, exposing said film at room temperature to the combined action of air and moisture to decompose it into niobium oxide and heating the dried niobium oxide film at a temperature of about 200 to 300° C. for about fifteen minutes to remove all volatile matter.

References Cited in the file of this patent

UNITED STATES PATENTS

| | | |
|---|---|---|
| 2,657,346 | Hill | Oct. 27, 1953 |
| 2,774,689 | Orthner | Dec. 18, 1956 |
| 2,796,364 | Suchoff | June 18, 1957 |
| 2,805,965 | Robinson | Sept. 10, 1957 |
| 2,827,401 | Laughlin | Mar. 18, 1958 |
| 2,943,955 | Brill | July 5, 1960 |